UNITED STATES PATENT OFFICE.

KARL A. HOHENSTEIN, OF BROOKLYN, NEW YORK, ASSIGNOR TO DAVID McMEEKAN AND ARABELLA G. WRIGHT, BOTH OF SAME PLACE.

CALCIMINE.

SPECIFICATION forming part of Letters Patent No. 321,109, dated June 30, 1885.

Application filed March 30, 1885. (No specimens.)

*To all whom it may concern:*

Be it known that I, KARL A. HOHENSTEIN, of Brooklyn, county of Kings, and State of New York, have invented certain new and useful Improvements in Calcimine, of which the following is a specification.

This invention has reference to an improved calcimine, which can be used for inside or outside walls, and which is capable of resisting rain and other atmospheric influences; and the invention consists of a calcimine formed of lime, caseine, borax, and a soluble gum.

In preparing my improved calcimine ninety-five pounds of whiting or slaked lime, two pounds of pulverized caseine, which has to be free of acid, two pounds of pulverized borax, and one pound of shellac or any other soluble gum are ground and thoroughly mixed.

When the calcimine is to be used, it is mixed with the usual pigments and water, and applied to the wall in the same manner as common calcimine. It can be applied for indoor or outdoor use, as the soluble gum renders it waterproof, while the caseine hardens it so as to resist in a higher degree the atmospheric influences.

Having thus described my invention, I claim as new, and desire to secure by Letters Patent—

A calcimine consisting of lime, caseine, borax, and a soluble gum, substantially as set forth.

In testimony that I claim the foregoing as my invention I have signed my name in presence of two subscribing witnesses.

KARL A. HOHENSTEIN.

Witnesses:
PAUL GOEPEL,
CARL KARP.